United States Patent
Sachs (10) Patent No.: US 11,790,057 B2
(45) Date of Patent: Oct. 17, 2023

(54) CONTROLLING PROGRAM EXECUTION USING AN ACCESS KEY

(71) Applicant: SAP SE, Walldorf (DE)

(72) Inventor: Gernot Sachs, Wiesloch (DE)

(73) Assignee: SAP SE, Walldorf (DE)

( * ) Notice: Subject to any disclaimer, the term of this patent is extended or adjusted under 35 U.S.C. 154(b) by 178 days.

(21) Appl. No.: 17/404,404

(22) Filed: Aug. 17, 2021

(65) Prior Publication Data

US 2023/0066159 A1 Mar. 2, 2023

(51) Int. Cl.
| | |
|---|---|
| G06F 21/12 | (2013.01) |
| H04L 9/32 | (2006.01) |
| H04L 9/30 | (2006.01) |
| H04L 9/08 | (2006.01) |
| G06F 8/60 | (2018.01) |
| G06F 21/10 | (2013.01) |

(52) U.S. Cl.
CPC .......... *G06F 21/121* (2013.01); *H04L 9/0825* (2013.01); *H04L 9/302* (2013.01); *H04L 9/3247* (2013.01); *G06F 8/60* (2013.01); *G06F 21/1063* (2023.08)

(58) Field of Classification Search
CPC .. G06F 21/121; G06F 8/60; G06F 2221/0731; G06F 2221/0751; G06F 21/12; H04L 9/0825; H04L 9/302; H04L 9/3247; H04L 9/32; H04L 9/30; H04L 9/08
See application file for complete search history.

(56) References Cited

U.S. PATENT DOCUMENTS

| 8,522,011 B2 | 8/2013 | Spalka et al. |
| 2002/0062451 A1 | 5/2002 | Scheidt et al. |

(Continued)

FOREIGN PATENT DOCUMENTS

| JP | 2004519874 | 7/2004 |
| JP | 2009049731 | 3/2009 |
| JP | 2021500831 | 1/2021 |

OTHER PUBLICATIONS

Cooper et al, "Security Considerations for Code Signing," NIST Cybersecurity White Paper, Published Jan. 26, 2018, retrieved from <URL: https://csrc.nist.gov/CSRC/media/Publications/white-paper/2018/01/26/security-considerations-for-code-signing/final/documents/security-considerations-for-code signing.pdf> [retrieved on Jun. 9, 2021], 13 pages.

(Continued)

*Primary Examiner* — Quazi Farooqui
(74) *Attorney, Agent, or Firm* — SCHWEGMAN LUNDBERG & WOESSNER, P.A.

(57) ABSTRACT

Systems, methods, and computer-readable media for controlling the execution of a deployed software program to a customer system are disclosed herein. A vendor may deploy a software program to the customer system. The software program may comprise an access key, the access key comprising a digital signature and access parameters. The digital signature may utilize a public key private key pair. The customer may run the software program by validating the access key on the customer system. Validating the access key may comprise verifying the digital signature and verifying the access parameters. Once the access key has been validated, the customer may execute the software program on the customer system.

20 Claims, 4 Drawing Sheets

(56) References Cited

U.S. PATENT DOCUMENTS

| | | | | |
|---|---|---|---|---|
| 2007/0244991 | A1* | 10/2007 | Dowling | H04L 63/0272 709/218 |
| 2010/0098248 | A1* | 4/2010 | Anantharaman | G06F 21/6218 713/176 |
| 2015/0304736 | A1* | 10/2015 | Lal | G06F 21/72 380/210 |
| 2019/0155591 | A1* | 5/2019 | Kumar | G06F 11/34 |
| 2019/0372776 | A1 | 12/2019 | Kroneisen et al. | |
| 2020/0014538 | A1 | 1/2020 | Liu | |

OTHER PUBLICATIONS

Grimes, "Methods to Prevent Unauthorized Execution," Flylib, Published 2004, retrieved from <URL: https://flylib.com/books/en/1.45.1.65/1/> [retreived on Jun. 9, 2021], 15 pages.

Weimerskirch et al, "Protecting Embedded Systems from Unauthorized Software Modifications," Military Embedded Systems, Published Jan. 4, 2010, retrieved from <URL: https://militaryembedded.com/avionics/safety-certification/protecting-systems-unauthorized-software-modifications> [retrieved on Jun. 9, 2021], 7 pages.

\* cited by examiner

CONTROLLING PROGRAM EXECUTION USING AN ACCESS KEY

TECHNICAL FIELD

Embodiments generally relate to controlling the execution of a computer program using an access key. More specifically, embodiments relate to controlling the execution of a custom-developed computer program deployed from a vendor to a customer using a digitally signed access key.

RELATED ART

Software vendors often provide and develop computer programs that are purchased by customers and implemented in the customer's business processes. A vendor may have a large number of customers, including various customers in various markets. Consequently, each customer may be using the same computer program but with varying data and data types that may cause an issue or a bug to result in the program. Whenever issues and data inconsistencies inevitably arise within the computer program, the vendor is, therefore, often unable to deploy a single software program that provides a blanket fix for each and every customer. As such, vendors will often develop specialized correction programs specifically to address a specific customer's problem. However, additional issues often arise when the customer attempts to use the customer program without having the correct technical expertise or background knowledge to run the program. This can lead to further data inconsistencies and potentially impact other programs in the customer's system that utilize software from the vendor. Additionally, customers may attempt to run the correction program to fix other data issues and inconsistencies that were unintended to be corrected by the specialized correction program.

Accordingly, a need exists for a method for a vendor to deploy correction programs and other programs to a customer system while having user-specific control over the customer execution of the program.

SUMMARY

Disclosed embodiments address the above-mentioned problems by providing a method for deploying custom software programs from a vendor system to a customer system and having control over the execution of the customer system. The vendor may specify a set of access parameters that must be validated. A digital signature may be created by hashing the set of access parameters and applying an encryption to the hashed set of access parameters.

A first embodiment is directed to a method of controlling execution of a software program deployed on a customer system, comprising deploying, from a vendor system to the customer system, the computer program, defining at least one vendor access parameter for the computer program, receiving, from a customer and at the customer system, an access key requesting access to execute the computer program, wherein the access key comprises a digital signature and at least one customer access parameter, validating, at the customer system, the digital signature using a public key private key pair, wherein the private key of the public key private key pair is known by the vendor system, verifying that the at least one customer access key matches the at least one vendor access parameter, and executing the computer program on the customer system.

A second embodiment is directed to one or more non-transitory computer-readable media storing computer-executable instructions that, when executed by a processor, perform a method of controlling execution of a computer program deployed on a customer system, comprising deploying, from a vendor system to the customer system, the computer program, wherein the computer program comprises an access key for executing the computer program, the access key comprising a digital signature and at least one access parameter, receiving, from a customer and at the customer system, the access key requesting access to execute the computer program, validating the digital signature for the access key, verifying the at least one access parameter, and in response to validating the digital signature and verifying the at least one access parameter, executing the computer program on the customer system.

A third embodiment is directed to a system for controlling execution of a computer program deployed on a customer system, comprising a processor, a data store, and one or more non-transitory computer-readable media storing computer-executable instructions that, when executed by the processor, perform a method of controlling execution of the computer program deployed on the customer system, comprising deploying, from a vendor system to the customer system, the computer program, defining at least one vendor access parameter for the computer program, receiving, from a customer and at the customer system, an access key requesting access to execute the software program, wherein the access key comprises a digital signature and at least one customer access parameter, verifying the at least one customer access key matches the at least one vendor access parameter, validating, at the customer system, the digital signature using a public key private key pair, and executing the computer program on the customer system.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present teachings will be apparent from the following detailed description of the embodiments and the accompanying drawing figures.

BRIEF DESCRIPTION OF THE DRAWING FIGURES

Embodiments are described in detail below with reference to the attached drawing figures, wherein.

The drawing figures do not limit the invention to the specific embodiments disclosed and described herein. The drawings are not necessarily to scale, emphasis instead being placed upon clearly illustrating the principles of the disclosure.

DETAILED DESCRIPTION

In some embodiments, a method of controlling the execution of a computer program developed by a vendor and delivered to a customer is provided. The customer may be running software purchased from the vendor. The customer may run into an issue while using the vendor software that requires a specialized fix. As such, the customer may contact the vendor to develop a fix in the form of code which is then sent back to the customer. The fix is typically developed for the specific issue the customer is facing. If the customer encounters another, unrelated issue with the vendor program, attempting to fix it with the specialized program may cause more issues without fixing the problem. Therefore, it is desired for the vendor to have control over the execution of the specialized program by the customer to prevent further issues from arising. In some embodiments, the execution is controlled using an access key. The access key may comprise various access parameters to validate a user attempting to execute the program and a digital signature to protect the key access. In some embodiments, the access key may only be created by the software vendor.

The subject matter of the present disclosure is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the present claims. Terms should not be interpreted as implying any particular ordering of various steps described unless the order of individual steps is explicitly described.

The following detailed description of embodiments references the accompanying drawings that illustrate specific embodiments in which the present teachings can be practiced. The described embodiments are intended to illustrate aspects of the disclosed invention in sufficient detail to enable those skilled in the art to practice the invention. Other embodiments can be utilized, and changes can be made without departing from the claimed scope of the invention. The following detailed description is, therefore, not to be taken in a limiting sense. The scope of embodiments is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Figure 1:
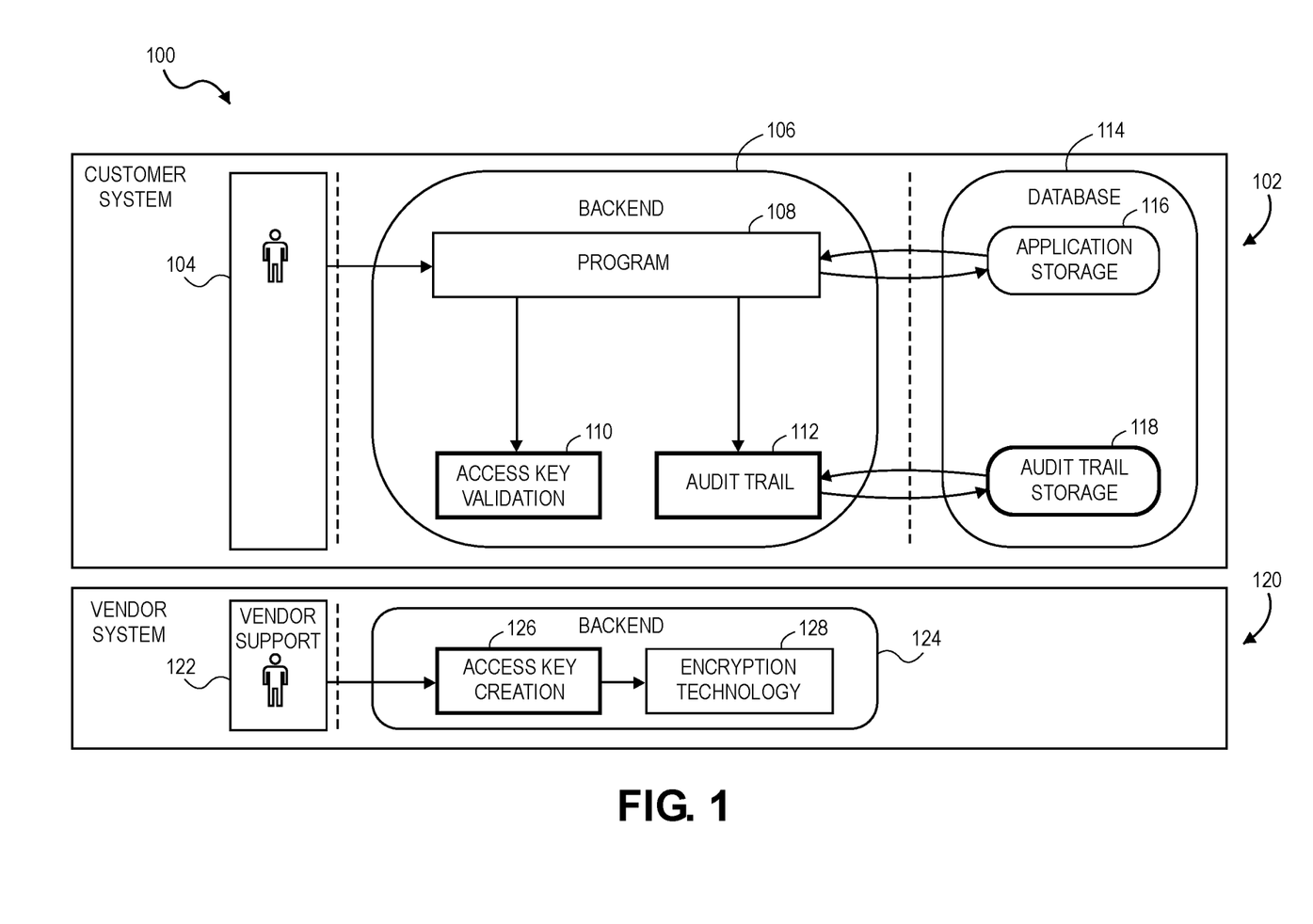
FIG. 1 illustrates a framework for controlling program execution for certain embodiments.

FIG. 1 illustrates access key framework 100 for controlling software execution for some embodiments. As depicted, access key framework 100 comprises customer system 102 used by customer 104. Customer system 102 further comprises customer back-end 106 which in turn may comprise program 108, access key validation 110, and audit trail 112. Program 108 may be connected or embedded with two separate parts: access key validation 110 and audit trail 112. While embodiments are described herein with reference to program 108 being used as a correction program for correcting inconsistencies within customer system 102, it should be noted that any type of computer program may be secured using the methods described herein.

In some embodiments, access key validation 110 comprises various attributes or access parameters that need to be verified before customer 104 is granted access to run program 108. In some embodiments, the attributes of access key validation 110 comprise an installation, a system identification, a user, a validity, a program ID, or a combination thereof. In some embodiments, the code for program 108 is set as an attribute of access key validation 110. In some embodiments, the installation attribute defines the installation version of access key framework 100 running on customer system 102. The installation version may also verify an operating system of the computer on which access key framework 100 is running. In some embodiments, the system identification identifies the particular hardware (e.g., laptop or PC) that access key framework 100 is running on.

In some embodiments, the user attribute may be a username identifying customer 104. If all users associated with customer system 102 are authorized to run program 108, the user attribute may not be included in the access parameters. In some embodiments, the validity may represent an access time for which program 108 is valid and may be set by the vendor. The validity may represent when the access key is set to expire. For example, the vendor may only want program 108 to be valid for one week. A larger number (e.g., 9,999) or a predefined string (e.g., 'Inf') may be used to set customer program 108 to be valid for a substantially indefinite period of time. In some embodiments, the validity time may be set to be a date at which program 108 is no longer able to be accessed. The program ID attribute may define which programs on customer system 102 need to be fixed by program 108. In some embodiments, program 108 is programmed to correct data inconsistencies or bugs afflicting one or more programs. In some embodiments, a separate access key validation 110 is required for each program on customer system 102 that needs to be corrected by customer program 108.

Audit trail 112 may store data received from customer 104 attempting to run program 108. For example, audit trail 112 may track each change on customer system 102 made by program 108. In some embodiments, audit trail 112 logs each attempt by customer system 102 to access program 108. As another example, audit trail 112 may log each access parameter associated with customer 104 when customer 104 attempts to access program 108. Audit trail 112 may also log metadata related to an access attempt. For example, audit trail 112 may log information such as a time stamp and date of access, whether or not the access was successful, and an IP address or other identifying information related to the access attempt.

Customer system 102 may further comprise database 114 to store various data associated with customer system 102. Database 114 may comprise application storage 116 and audit trail storage 118. As illustrated, application storage 116 may store and send data to and from program 108. Likewise, audit trail storage 118 may store and send data to and from audit trail 112. Audit trail storage 118 may store all data and/or metadata associated with an access attempt as described above.

Access key framework 100 may also comprise vendor system 120 used by vendor support 122. Vendor system 120 may comprise vendor back-end 124. In some embodiments, vendor back-end 124 comprises access key 126 and encryption technology 128. When vendor support 122 receives a request from customer 104 to develop program 108, it may be desired to create access key 126 to secure the execution of program 108 and prevent any unwanted execution of program 108. As described above, inappropriate usage of program 108 may cause additional issues within customer system 102. Access key 126 may be created at vendor system 120. In some embodiments, access key 126 is created prior to the deployment of program 108. Access key 126 may comprise the same access parameters as described above. Vendor support 122 may define the installation, the system ID, the user, the validity of access key 126, the program, or a combination thereof when creating access key 126. In some embodiments, access key 126 comprises the access parameters along with encryption technology 128. In some embodiments, access key 126 is configured for each separate program 108 developed by vendor support 122 such that separate correction programs 108 may have differing access levels and parameters.

Encryption technology 128 may be generated by vendor support 122 when creating access key 126. Encryption technology 128 may comprise a cryptographic key that must be validated by customer 104 in order to run program 108. In some embodiments, encryption technology 128 employs a public key infrastructure (PKI) to secure the execution of program 108 and may use various cryptographic algorithms in the implementation of the PKI. For example, encryption technology 128 may utilize public-key cryptography in which there is a public key private key pair. In some embodiments, the public key is known to customer system 102 and vendor system 120. The public key may be deployed to customer system 102 as a part of the program that is being fixed by program 108. In some embodiments, the public key is deployed with program 108. In some embodiments, the private key is known only to vendor system 120. In some embodiments, encryption technology 128 comprises a digital signature that is created at vendor system 120 and transmitted to customer system 102 as part of access key 126. When vendor support 122 creates the digital signature, and the digital signature, as part of access key 126, is validated in customer system 102, customer 104 can be substantially confident that program 108 is authentic, was created by vendor support 122, and was not compromised by a third-party. Public key cryptography may be implemented using various algorithms. For example, encryption technology 128 may utilize the Diffie-Hellman key exchange, the Digital Signature algorithm, the Digital Signature Standard, the RSA algorithm, ElGamal, Elliptic-curve cryptography, Paillier cryptosystem, Cramer-Shoup cryptosystem, YAK, or a combination thereof.

In some embodiments, access key 126 may be configured to secure only a portion of program 108. For example, vendor support 122 may test program 108 and discover that only a portion of program 108 may cause further issues within customer system 102. As such, vendor support 122 may only lock that specific portion of program 108.

Figure 2:
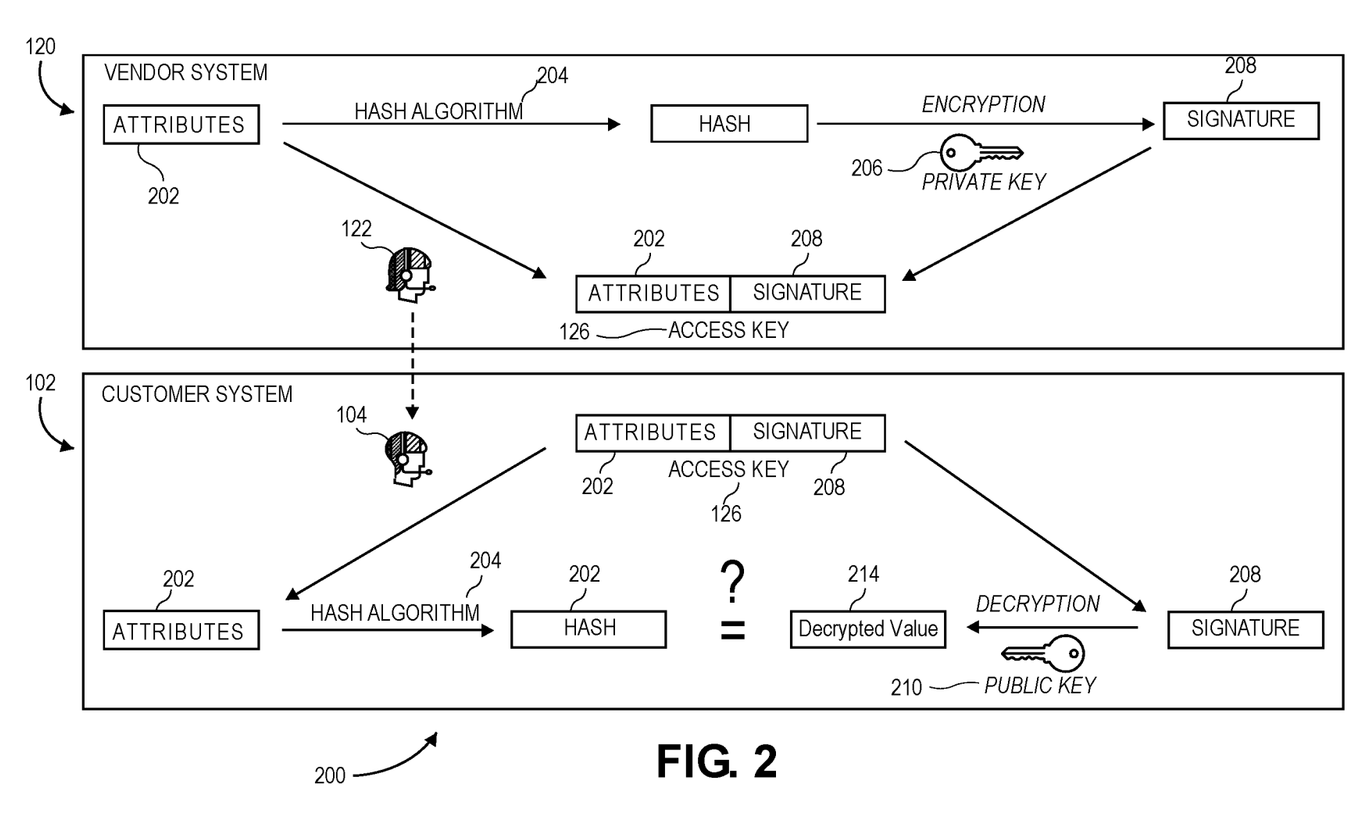
FIG. 2 illustrates an access key architecture for certain embodiments.

FIG. 2 illustrates access key architecture 200 for implementing access key 126 for certain embodiments. As described above, access key 126 may comprise a set of access key attributes 202 defined by vendor support 122 along with encryption technology 128. Access key 126 may be created by vendor support 122 and transmitted to customer 104. In operation, to create access key 126, thereby controlling access to program 108, the access key attributes 202 may first be hashed using a hash algorithm 204 at vendor system 120, thus creating access key attributes hash 206. Access key attributes 202 may be stored as a string of integers or a string of alphanumeric characters. In some embodiments, any standard hash function capable of hashing alphanumeric characters may be used for hash algorithm 204. Once hashed, the access key attributes 202 may then be encrypted within vendor system 120 using private key 208 of the private key public key pair to create signature 210. In some embodiments, the encryption is done using the RSA algorithm. As such, when transmitted to customer system 102, access key 126 may comprise the raw data for access key attributes 202 along with signature 210 (i.e., the encrypted access key attributes hash 206). In some embodiments, access key 126 is transmitted as a single string with a pre-defined character or operator (e.g., the '%' symbol) separating access key attributes 202 from signature 210.

To execute program 108, customer system 102 may have to validate signature 210 as described above. In some embodiments, signature 210 corresponds to encryption technology 128 described with respect to FIG. 1. Once signature 210 is validated, customer attributes may then be verified at customer system 102 and program 108 may be executed, as will be discussed further with respect to FIG. 3. At customer system 102, access key 126, received from vendor support 122, may then be split into access key attributes 202 and signature 210 as illustrated. To validate signature 210, customer system 102 may first decrypt signature 210 using public key 212 of the public key private key pair. The output of the decryption of signature 210 at customer system 102 may be decrypted signature 214. Access key attributes 202 may then be hashed at customer system 102 using the same hash algorithm 204 that was utilized to hash access key attributes 202 at vendor system 120, thereby outputting access key attributes hash 206. To determine that signature 210 is valid, access key attributes hash 206 may be compared to decrypted signature 214. If access key attributes hash 206 and decrypted signature 214 are equal, signature 210 may be considered to be validated. At this point, customer access key attributes may be validated for customer system 102 by ensuring access key attributes 202 defined by vendor support 122 match the respective attributes in the customer system. These attributes in the customer system 102 may be derived at runtime when program 108 is executed or entered upfront upon the program execution by customer 104.

Figure 3:
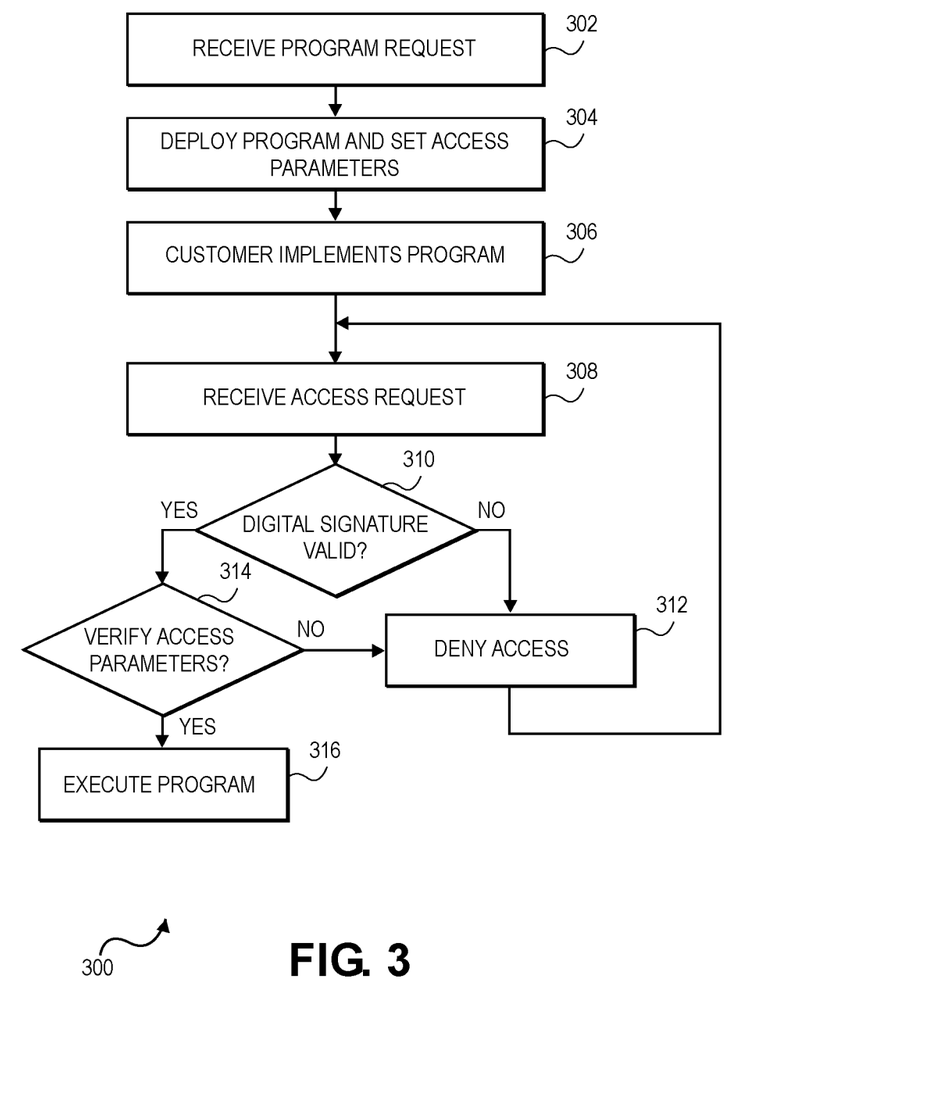
FIG. 3 illustrates an exemplary flow chart for a method of controlling program execution for certain embodiments.

FIG. 3 illustrates an exemplary method 300 of controlling the execution of a computer program deployed from vendor system 120 to customer system 102 for some embodiments. Method 300 may begin at step 302 where a request for program 108 is received. The program request may be made from customer 104 to vendor support 122. The program 108 request may be received in response to a bug or other software issue encountered by customer 104 when using a vendor program delivered by vendor support 122. In some embodiments, the bug is a data issue or inconsistency in a data table. It may be difficult for customer 104 or even technically impossible to correct the bug without expert knowledge of the vendor program from vendor support 122. Vendor support 122 may also desire for customer 104 to not attempt to fix the data issue themselves because it is likely customer 104 will only cause further issues within the vendor program.

At step 304, vendor support 122 may deploy program 108 and define access parameters for program 108. Program 108 may be deployed to customer system 102 using any conventional method. For example, program 108 may be uploaded to the internet, to a secure web portal, sent as an attachment via email, or using other similar methods. In some embodiments, program 108 is deployed via a .txt file. In some embodiments, program 108 may be injected into customer system 102.

The access parameters defined by vendor support 122 may add an extra layer of security to prevent unwanted users from running program 108. The access parameters may be at least one of an installation version, a system identification, a username, a validity time, or a program ID as described above. In some embodiments, the installation version identifies the current version of the to-be-fixed computer program or application that is running on customer system 102. It may be necessary to verify the installation version because program 108 may not be compatible with all versions of the computer program.

In some embodiments, the system identification may be used to identify the specific computer or other computing device (e.g., mobile phone, laptop, or tablet) that customer 104 is currently using to run software form vendor system 120. There may be a plurality of computers at the workplace of customer 104 and, as such, it may be desired to verify which specific computer program 108 is being ran on. Having this data trail may help to identify and solve any subsequent errors when implementing program 108.

Another access parameter that may be defined by vendor support 122 is a username. Vendor support 122 may define the username access parameter to ensure only authorized users that utilize customer system 102 can run program 108. In this way, vendor support 122 can ensure that only users who have the requisite knowledge to correctly execute program 108 are allowed access to execute program 108. In some embodiments, vendor support 122 defines a plurality of usernames to have access to run program 108.

Vendor support 122 may also define a validity parameter. In some embodiments, the validity parameter sets a limit on how long access key 126 is valid. For example, vendor support 122 may define the validity parameter to seven days if it is desired customer 104 only has seven days to run program 108. In some embodiments, if vendor support 122 wants customer 104 to be able to run program 108 unlimited times, vendor support 122 may set the validity to a substantially high number, such as 9,999 days. In some embodiments, vendor support 122 can set a specific date for access key 126 to expire. For example, access key 126 could be configured to expire at 11:59 pm on December $31^{st}$ using the validity parameter. Vendor support 122 may also define a runtime parameter to control the number of runtimes for program 108. For example, running program 108 multiple times may cause further bugs to be produced. As such, vendor support 122 may limit the amount of times program 108 may be executed.

In some embodiments, vendor support 122 may also define a program ID access parameter. The program ID access parameter may indicate which programs on customer system 102 customer program 108 should be executed on. As such, vendor support 122 may prevent customer 104 from inadvertently running program 108 on a vendor program that did not need to be corrected. Because program 108 is often a program developed to specifically target the data inconsistency identified by customer 104, running program 108 with a vendor program that program 108 was not designed to fix may cause additional issues at customer system 102. In some embodiments, the program ID is defined to cover multiple programs that need to be corrected using program 108.

In some embodiments, when program 108 is created and the access parameters are defined, program 108 is digitally signed using the private part of the encryption key. The private part of the encryption key may only be known to vendor system 120 and may only be generated at vendor system 120. When deployed to customer system 102, access key 126 may comprise the concatenation of access key attributes 202 and signature 210, wherein signature 210 comprises an encryption version of access key attributes hash 206.

At step 306, the customer may receive and implement program 108 delivered by vendor system 120. Customer implementation may comprise downloading the file deployed at step 304, copying of the .txt file into customer system 102, or any other suitable method of merging program 108 into customer system 102.

Next, at step 308, an access request to execute the program may be received in response to customer 104 attempting to run program 108. In some embodiments, the access request is received from customer 104 and at customer system 102. The access request may comprise access key 126, comprising signature 210 and access key attributes 202. As described above, when customer 104 runs program 108, audit trail 112 may log the access attempt in audit trail storage 118 along with any corrections or changes made by program 108 to customer system 102.

Once the access request, comprising signature 210, is received, processing may proceed to step 310 where it is determined if signature 210 is valid. The validity of signature 210 may be determined using encryption technology 128. In some embodiments, the validation of signature 210 is performed on customer system 102 using public key 212 of the encryption key. In some embodiments, the public key 212 of the public key private key pair is distributed to customer system 102 from vendor system 120. If access key attributes hash 206 does not match decrypted signature 214, it may be determined that signature 210 is not valid, processing may proceed to step 312. If it is determined that signature 210 is valid, processing may instead proceed to step 314.

At step 312, when it is determined that signature 210 is not valid, customer 104 is denied access to executing program 108. At this point, processing may return to step 308, and customer 104 may attempt to request access again. In some embodiments, vendor support 122 may set a limit on how many times customer 104 can attempt to access program 108 before locking customer 104 from attempting to access program 108.

At step 314, after it is determined that signature 210 is valid, it may be determined if access key attributes for customer 104 are also valid. In some embodiments, the access key attributes 202 defined by vendor support 122 are compared against the access key attributes of customer system 102. For example, the system user identification access parameter defined by vendor support 122 may be checked against a user identification associated with customer 104. In some embodiments, the access key attributes of customer system 102 are received at runtime when attempting to execute program 108. If the access parameters from customer system 102 match those defined by vendor support 122, processing proceeds to step 316. If the access key parameters from customer system 102 do not match those defined by vendor support 122, processing proceeds back to step 312 and customer 104 may attempt to re-access program 108.

In some embodiments, step 312 and step 314 are performed in reverse order with the access parameters being verified prior to validating signature 210. If customer 104 attempts to run program 108 on an incompatible system, such as an old software version, further issues with customer system 102 may arise. As such, validating access key attributes in customer system 102, such as the installation and the system identification, may avoid allowing the execution of program 108 on an invalid system. In some such embodiments, only a subset of access parameters is validated prior to verifying signature 210.

At step 316, after signature 210 and access key attributes in customer system 102 have been validated, customer 104 may execute program 108 to correct the bugs or data inconsistencies present in customer system 102. In some embodiments, once signature 210 and the access key parameters have been verified, customer 104 may execute program 108 until the validity of access key 126 ends. In some embodiments, customer 104 must proceed through at least steps 306-316 each time customer 104 wants to execute program 108. In some embodiments, customer 104 may have to be re-validated on a daily, weekly, monthly, or any other time basis. In some embodiments, step 314 and step 316 may be executed simultaneously or near simultaneous and access key attributes in customer system 102 are validated at runtime of program 108.

Figure 4:
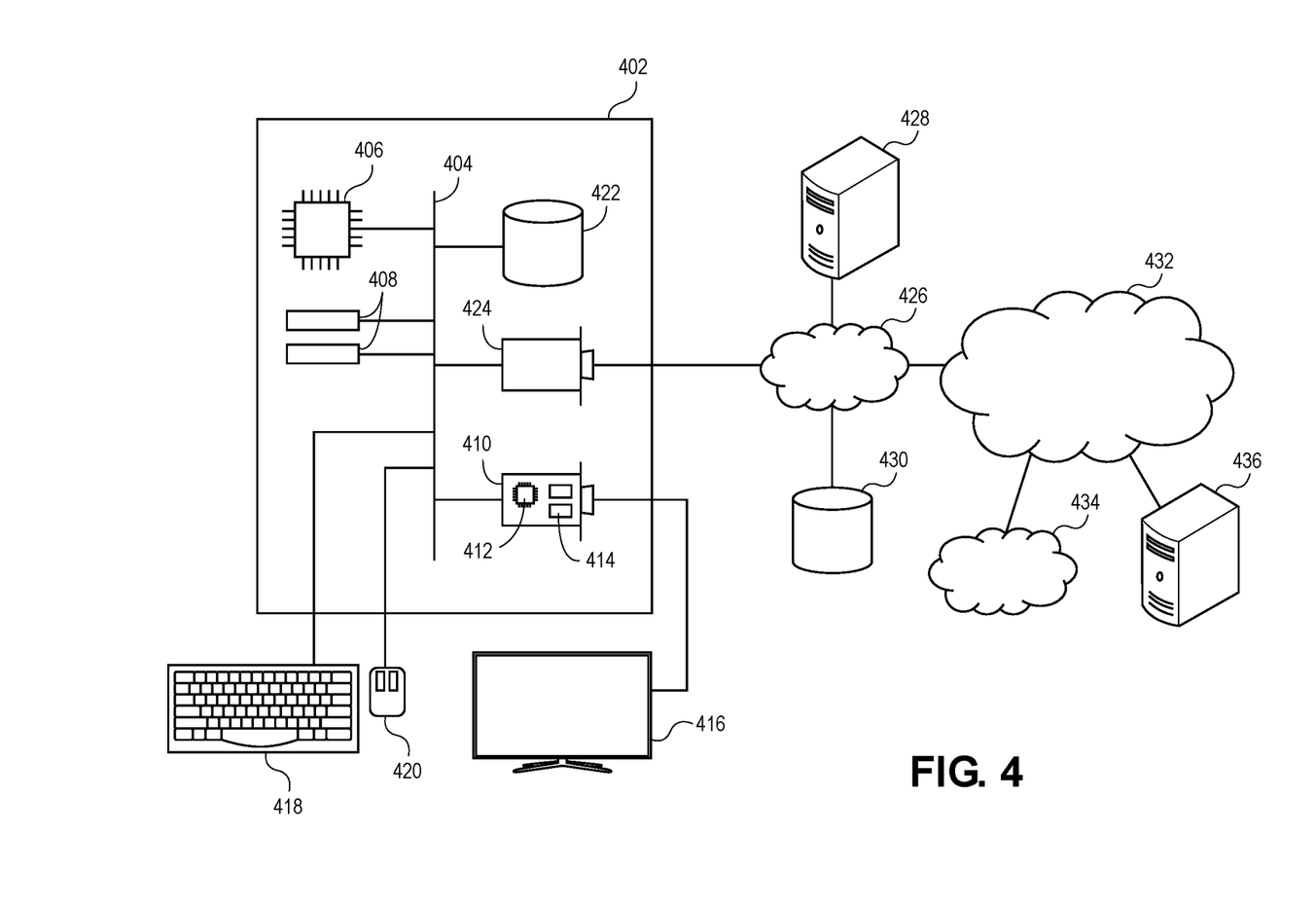
FIG. 4 depicts an exemplary hardware platform for certain embodiments.

Turning now to FIG. 4, in which an exemplary hardware platform for certain embodiments is depicted. Computer 402 can be a desktop computer, a laptop computer, a server computer, a mobile device such as a smartphone or tablet, or any other form factor of general- or special-purpose computing device containing at least one processor. Depicted with computer 402 are several components, for illustrative purposes. In some embodiments, certain components may be arranged differently or absent. Additional components may also be present. Included in computer 402 is system bus 404, via which other components of computer 402 can communicate with each other. In certain embodiments, there may be multiple busses or components may communicate with each other directly. Connected to system bus 404 is central processing unit (CPU) 406. Also attached to system bus 404 are one or more random-access memory (RAM) modules 408. Also attached to system bus 404 is graphics card 410. In some embodiments, graphics card 410 may not be a physically separate card, but rather may be integrated into the motherboard or the CPU 406. In some embodiments, graphics card 410 has a separate graphics-processing unit (GPU) 412, which can be used for graphics processing or for general purpose computing (GPGPU). Also, on graphics card 410 is GPU memory 414. Connected (directly or indirectly) to graphics card 410 is display 416 for user interaction. In some embodiments no display is present, while in others it is integrated into computer 402. Similarly, peripherals such as keyboard 418 and mouse 420 are connected to system bus 404. Like display 416, these peripherals may be integrated into computer 402 or absent. Also connected to system bus 404 is local storage 422, which may be any form of computer-readable media, such as non-transitory computer readable media, and may be internally installed in computer 402 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 424 is also attached to system bus 404 and allows computer 402 to communicate over a network such as network 426. NIC 424 can be any form of network interface known in the art, such as Ethernet, ATM, fiber, Bluetooth, or Wi-Fi (i.e., the Institute of Electrical and Electronics Engineers (IEEE) 802.11 family of standards). NIC 424 connects computer 402 to local network 426, which may also include one or more other computers, such as computer 428, and network storage, such as data store 430. Generally, a data store such as data store 430 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 428, accessible on a local network such as local network 426, or remotely accessible over public Internet 432. Local network 426 is in turn connected to public Internet 432, which connects many networks such as local network 426, remote network 434 or directly attached computers such as computer 436. In some embodiments, computer 402 can itself be directly connected to public Internet 432.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, memory, and Programmable Logic Devices (PLDs), used to provide machine instructions and/or data to a programmable processor, including a computer-readable medium that receives machine instructions as a computer-readable signal. The term "computer-readable signal" refers to any signal used to provide machine instructions and/or data to a programmable processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, for example as would a processor cache or other random-access memory associated with one or more physical processor cores.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method comprising:
   deploying, from a vendor system to a customer system, a first computer program;
   receiving, from the customer system, an indication of an inconsistency in a data table encountered during execution of the first computer program;
   accessing a second computer program designed to fix the inconsistency;
   defining at least one vendor access parameter for the second computer program;
   deploying from the vendor system to the customer system, the second computer program;
   receiving, from a customer at the customer system, an access key requesting access to execute the second computer program,
   wherein the access key comprises a digital signature and at least one customer access parameter;
   validating, at the customer system, the digital signature using a public key private key pair,
   wherein the private key of the public key private key pair is known by the vendor system as corresponding to one or more vendor-approved users having requisite knowledge to correctly execute the second program to fix the inconsistency;
   verifying that the at least one customer access parameter matches the at least one vendor access parameter; and
   in response to the verifying, causing execution of the second computer program on the customer system.

2. The method of claim 1, wherein the at least one vendor access parameter comprises a user identification.

3. The method of claim 1, wherein the at least one vendor access parameter comprises a validity time parameter indicative of an amount of time the access key is valid.

4. The method of claim 1, wherein the method further comprises generating the public key private key pair using a Rivest-Shamir-Adleman% RSA) algorithm.

5. The method of claim 1, wherein the method further comprises delivering, from the vendor system to the customer system, the public key of the public key private key pair.

6. The method of claim 1, wherein the second computer program is a specialized computer program developed to correct a data inconsistency within the customer system.

7. The method of claim 1, wherein the at least one customer access parameter is verified at a runtime associated with the second computer program.

8. One or more non-transitory computer-readable media storing computer-executable instructions that, when executed by a processor, perform a method comprising:
   deploying, from a vendor system to a customer system, a first computer program;
   receiving, from the customer system, an indication of an inconsistency in a data table encountered during execution of the first computer program;
   accessing a second computer program designed to fix the inconsistency;
   defining at least one vendor access parameter for the second computer program;
   deploying from the vendor system to the customer system, the second computer program;
   receiving, from a customer at the customer system, an access key requesting access to execute the second computer program,
   wherein the access key comprises a digital signature and at least one customer access parameter;
   validating, at the customer system, the digital signature using a public key private key pair,
   wherein the private key of the public key private key pair is known by the vendor system as corresponding to one or more vendor-approved users having requisite knowledge to correctly execute the second program to fix the inconsistency;
   verifying that the at least one customer access parameter matches the at least one vendor access parameter; and
   in response to the verifying, causing execution of the second computer program on the customer system.

9. The media of claim 8, wherein the access key is configured to control the execution of a portion of the second computer program.

10. The media of claim 8, wherein the at least one access parameter comprises a runtime parameter indicative of a number of times the second computer program can be executed.

11. The media of claim 8, wherein the method further comprises generating the digital signature using a public key infrastructure.

12. The media of claim 8, wherein the method further comprises storing the at least one access parameter in a data store.

13. The media of claim 8, wherein the at least one access parameter is a client identification parameter validating a client associated with the customer system.

14. The media of claim 8, wherein the method further comprises in response to receiving the access key, generating a time stamp for the access key.

15. A system for controlling execution of a computer program deployed on a customer system, comprising:
   a data store;
   a processor; and
   one or more non-transitory computer-readable media storing computer-executable instructions that, when executed by the processor, perform a method comprising:

deploying, from a vendor system to a customer system, a first computer program;

receiving, from the customer system, an indication of an inconsistency in a data table encountered during execution of the first computer program;

accessing a second computer program designed to fix the inconsistency;

defining at least one vendor access parameter for the second computer program;

deploying from the vendor system to the customer system, the second computer program;

receiving, from a customer at the customer system, an access key requesting access to execute the second computer program, wherein the access key comprises a digital signature and at least one customer access parameter;

validating, at the customer system, the digital signature using a public key private key pair, wherein the private key of the public key private key pair is known by the vendor system as corresponding to one or more vendor-approved users having requisite knowledge to correctly execute the second program to fix the inconsistency;

verifying that the at least one customer access parameter matches the at least one vendor access parameter; and in response to the verifying, causing execution of the second computer program on the customer system.

16. The system of claim 15, wherein the at least one vendor access parameter comprises at least one of an installation identification and a software identification to validate the second computer program is compatible with the customer system.

17. The system of claim 15, wherein the second computer program is a specialized correction program configured to correct a bug within the customer system.

18. The system of claim 17, wherein the at least one vendor access parameter comprises a program identification parameter allowing the second computer program to correct the bug across a plurality of computer programs within the customer system.

19. The system of claim 18, wherein the method further comprises encrypting the at least one vendor access parameter to create the digital signature.

20. The system of claim 19, wherein the digital signature is created at the vendor system.

* * * * *